United States Patent
Chen

(10) Patent No.: US 8,220,110 B1
(45) Date of Patent: Jul. 17, 2012

(54) CASTOR HAVING A BRAKING FUNCTION

(75) Inventor: Ching-Tsun Chen, Wan-Nian Li (TW)

(73) Assignee: Der Sheng Co., Ltd., Changhua County (TW)

( * ) Notice: Subject to any disclaimer, the term of this patent is extended or adjusted under 35 U.S.C. 154(b) by 5 days.

(21) Appl. No.: 13/031,753

(22) Filed: Feb. 22, 2011

(51) Int. Cl.
*B60B 33/00* (2006.01)

(52) U.S. Cl. ........................................ 16/35 R

(58) Field of Classification Search .......... 16/35 R, 16/35 D, 37, 38; 188/1.12, 24.21, 24.22, 188/24.12, 24.13, 24.16, 24.19, 20; 5/86.1, 5/600, 620; 280/87.042, 79.11, 47.11, 428, 280/651, 652, 658

See application file for complete search history.

(56) References Cited

U.S. PATENT DOCUMENTS

| | | | |
|---|---|---|---|
| 3,890,669 A * | 6/1975 | Reinhards | 16/35 R |
| 4,035,864 A * | 7/1977 | Schroder | 16/35 R |
| 4,349,937 A * | 9/1982 | Fontana | 16/35 R |
| 6,810,560 B1 * | 11/2004 | Tsai | 16/35 R |
| 7,546,908 B2 * | 6/2009 | Chang | 188/1.12 |
| 2009/0019670 A1 * | 1/2009 | Tsai | 16/35 R |
| 2009/0276977 A1 * | 11/2009 | Liao | 16/35 R |

FOREIGN PATENT DOCUMENTS

| | | | | |
|---|---|---|---|---|
| JP | 06016002 A | * | 1/1994 | |
| JP | 08207504 A | * | 8/1996 | |
| JP | 09076704 A | * | 3/1997 | |
| JP | 11321208 A | * | 11/1999 | |
| JP | 2001191709 A | * | 7/2001 | |

* cited by examiner

*Primary Examiner* — Chuck Y. Mah
(74) *Attorney, Agent, or Firm* — Alan Kamrath; Kamrath IP Lawfirm, PA

(57) ABSTRACT

A castor includes a connecting board, a base bracket connected with the connecting board, a locking disk connected with the connecting board, a wheel mounted on the base bracket, a mounting bracket secured on the base bracket, a braking member connected with the mounting bracket, and a drive unit connected with the braking member. The locking disk has a locking portion. The braking member has a first end provided with a locking section and a second end provided with a mounting portion which has a braking section. Thus, the braking member is pivoted by the drive unit so that the braking section of the braking member is moved to press and brake the wheel, and the locking section of the braking member is moved to engage the locking portion of the locking disk so as to lock the base bracket.

10 Claims, 4 Drawing Sheets

CASTOR HAVING A BRAKING FUNCTION

BACKGROUND OF THE INVENTION

1. Field of the Invention

The present invention relates to a wheeled vehicle and, more particularly, to a castor for a chair or the like.

2. Description of the Related Art

A conventional castor comprises a shaft, a mounting bracket pivotally mounted on the shaft and a wheel rotatably mounted on the mounting bracket. The shaft is mounted on the bottom of an object, such as a chair, cart, cabinet, shelf and the like. When the castor is moved, the wheel is rotated on the mounting bracket, and the mounting bracket is rotated on the shaft. Thus, the castor is moved freely so as to support and move the object. However, the castor does not have a braking function so that the object is not positioned in place exactly and stably, thereby causing inconvenience to the user.

BRIEF SUMMARY OF THE INVENTION

In accordance with the present invention, there is provided a castor, comprising a connecting board, a base bracket pivotally connected with the connecting board, a locking disk connected with the connecting board, a wheel rotatably mounted on the base bracket, a mounting bracket secured on the base bracket, a braking member pivotally connected with the mounting bracket and releasably locked onto the locking disk and the wheel to releasably lock the base bracket onto the connecting board and to releasably lock the wheel onto the base bracket, and a drive unit pivotally connected with the braking member to move the braking member relative to the locking disk and the wheel.

The locking disk has a periphery provided with a toothed locking portion. The braking member has a first end provided with a toothed locking section that is movable to engage the locking portion of the locking disk and a second end provided with a mounting portion. The mounting portion of the braking member has a side provided with a braking section that is movable to press the wheel. The drive unit includes a driving plate pivotally connected with the braking member, and a linking block pivotally connected with the driving plate. The driving plate of the drive unit has a first end provided with a first pivot section and a second end provided with a second pivot section. The first pivot section of the driving plate is pivotally connected with the linking block of the drive unit. The second pivot section of the driving plate is pivotally connected with the mounting portion of the braking member. The braking member has a mediate portion provided with a pivot portion pivotally connected with the mounting bracket. The pivot portion of the braking member is disposed between the locking section and the braking section of the braking member. The pivot portion of the braking member has a surface provided with an elastic resting portion abutting a top wall of the base bracket.

The primary objective of the present invention is to provide a castor having a braking function.

According to the primary advantage of the present invention, when the drive unit is pressed, the braking member is driven by the drive unit and is pivoted relative to the locking disk and the wheel so that the braking section of the braking member is moved downward to press the wheel so as to brake and lock the wheel, and the locking section of the braking member is moved upward to engage the locking portion of the locking disk so as to lock and position the base bracket.

According to another advantage of the present invention, the wheel is locked onto the base bracket, and the base bracket is locked onto the connecting board so that the castor is braked and positioned exactly and stably.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
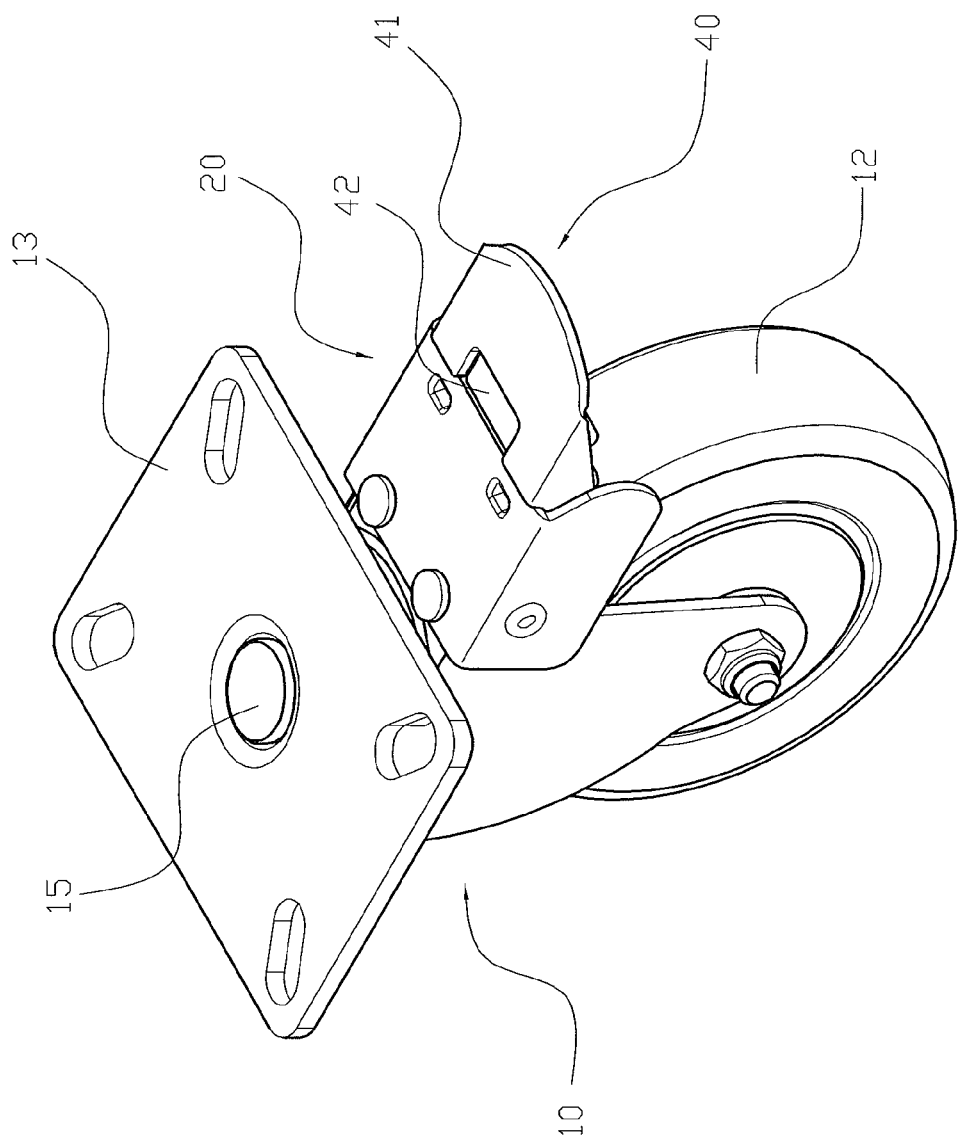
FIG. 1 is a perspective view of a castor in accordance with the preferred embodiment of the present invention.
Figure 2:
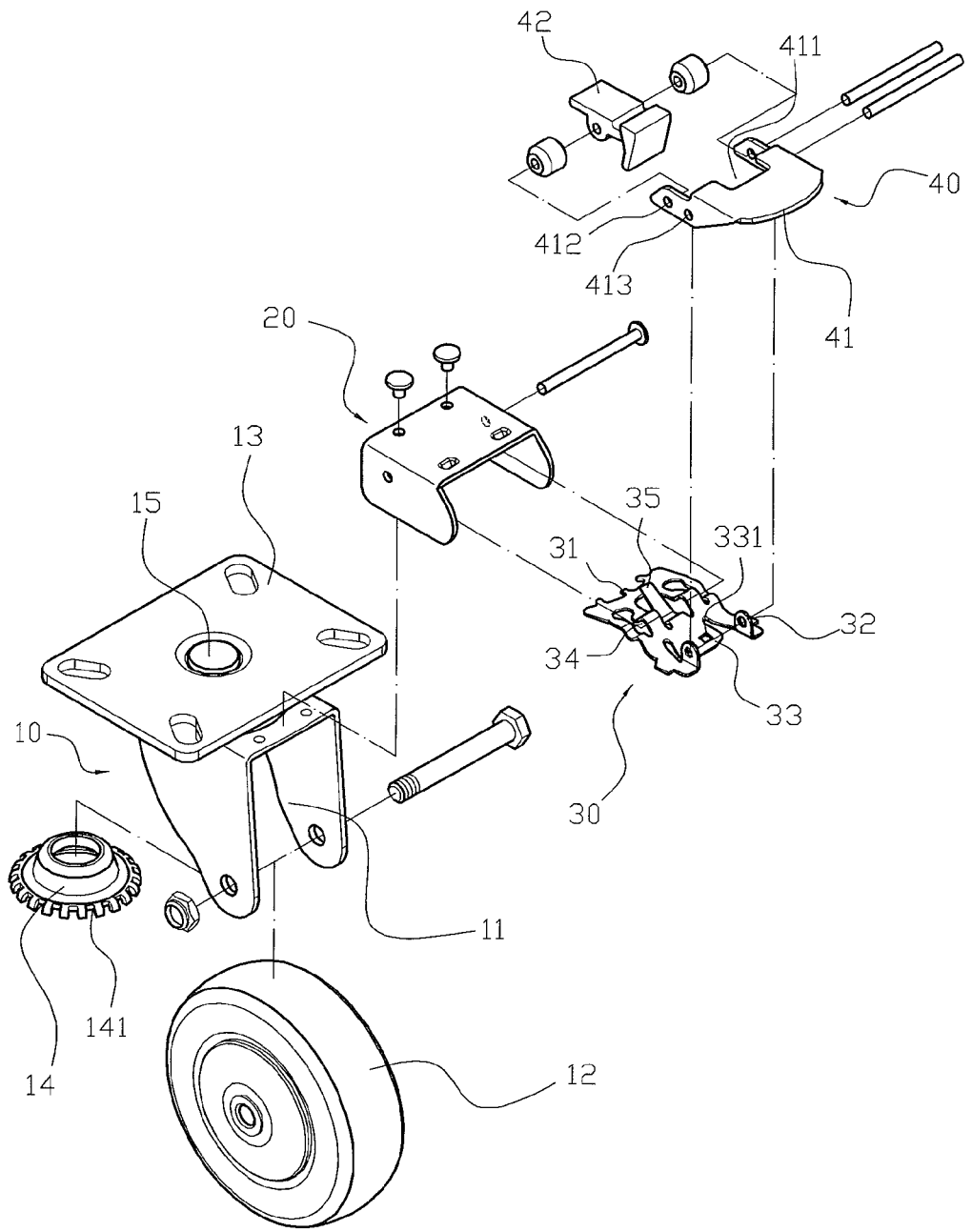
FIG. 2 is an exploded perspective view of the castor as shown in FIG. 1.
Figure 3:
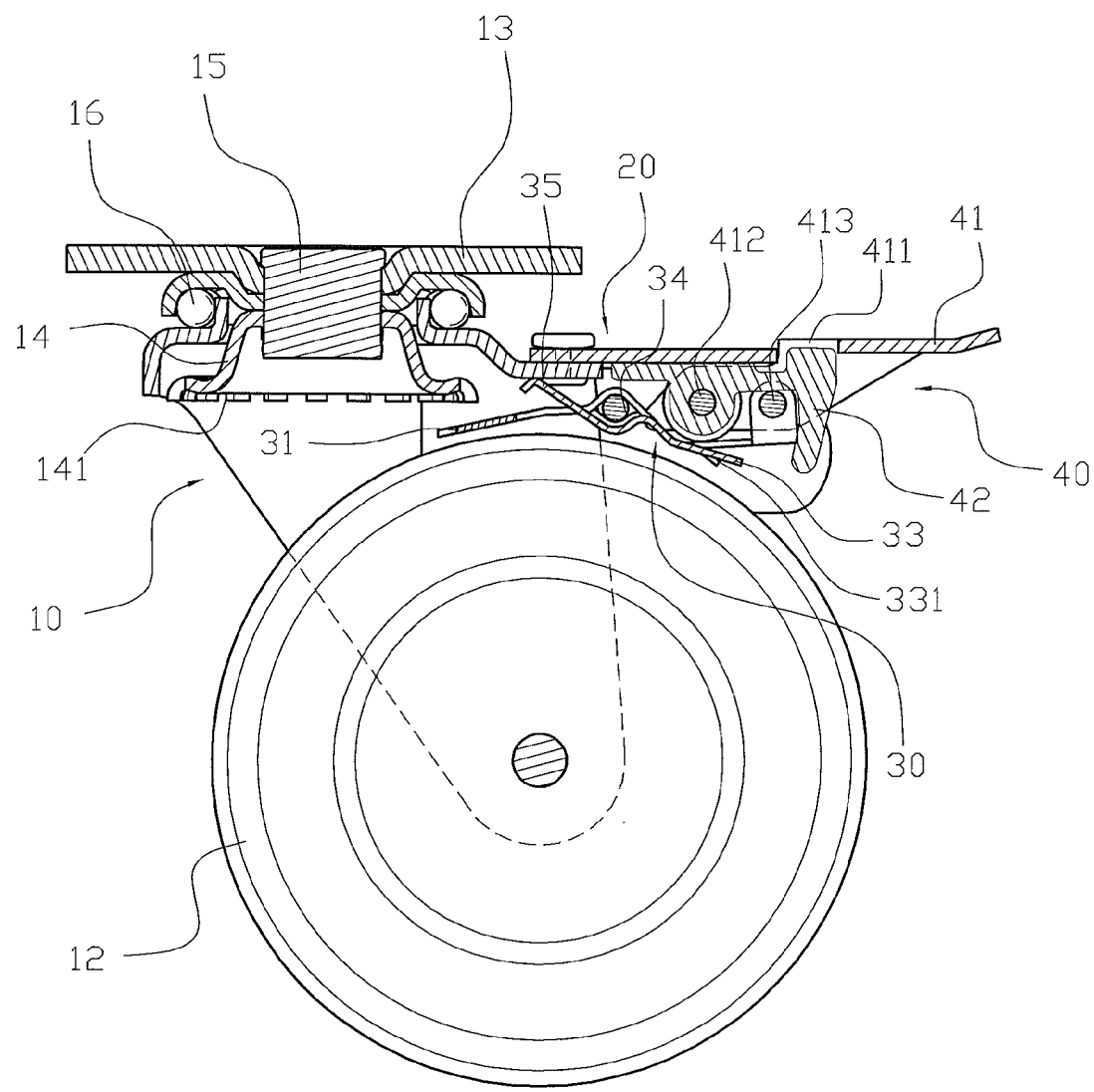
FIG. 3 is a side cross-sectional view of the castor as shown in FIG. 1.

Referring to the drawings and initially to FIGS. 1-3, a castor in accordance with the preferred embodiment of the present invention comprises a connecting board 13, a base bracket 10 pivotally connected with the connecting board 13, a locking disk 14 connected with the connecting board 13, a wheel 12 rotatably mounted on the base bracket 10, a mounting bracket 20 secured on the base bracket 10, a braking member 30 pivotally connected with the mounting bracket 20 and releasably locked onto the locking disk 14 and the wheel 12 to releasably lock the base bracket 10 onto the connecting board 13 and to releasably lock the wheel 12 onto the base bracket 10, and a drive unit 40 pivotally connected with the braking member 30 to move the braking member 30 relative to the locking disk 14 and the wheel 12.

The base bracket 10 is pivotally connected with the connecting board 13 by a bearing 16. The base bracket 10 has a substantially inverted U-shaped profile and has an inner portion provided with a receiving space 11 to receive the locking disk 14 and the wheel 12. The base bracket 10 has a top pivotally connected with the connecting board 13. The connecting board 13 is mounted on the bottom of an object, such as a chair, cart, cabinet, shelf and the like.

The locking disk 14 is fixedly connected with the connecting board 13 by an upright support shaft 15. The locking disk 14 is disposed in the receiving space 11 of the base bracket 10 and is located above the wheel 12. The locking disk 14 has a periphery provided with a toothed locking portion 141.

The mounting bracket 20 has a substantially inverted U-shaped profile. The mounting bracket 20 is mounted on an open side of the base bracket 10 and is located beside the receiving space 11 of the base bracket 10.

The braking member 30 is an elastic plate. The braking member 30 is pivotally mounted in the mounting bracket 20 and has a first end provided with a toothed locking section 31 that is movable to engage the locking portion 141 of the locking disk 14 and a second end provided with a mounting portion 32. The locking section 31 of the braking member 30 is disposed under the locking portion 141 of the locking disk 14 at a normal state. The mounting portion 32 of the braking member 30 has a middle position provided with a braking section 33 that is movable to press the wheel 12. The braking section 33 of the braking member 30 is disposed above the wheel 12 at a normal state and presses the wheel 12 when the locking section 31 of the braking member 30 engages the locking portion 141 of the locking disk 14. The braking section 33 of the braking member 30 has a bottom provided with a plurality of wedge-shaped engaging blocks 331 that are movable to engage the wheel 12. The braking member 30 has a mediate portion provided with a pivot portion 34 pivotally connected with the mounting bracket 20. The pivot portion 34 of the braking member 30 is disposed between the locking section 31 and the braking section 33 of the braking member 30. The pivot portion 34 of the braking member 30 has a surface provided with an elastic resting portion 35 abutting a top wall of the base bracket 10. The elastic resting portion 35 of the braking member 30 abuts the top wall of the base bracket 10 when the braking section 33 of the braking member 30 is spaced from the wheel 12 and when the locking section 31 of the braking member 30 is spaced from the locking portion 141 of the locking disk 14. Thus, the elastic resting portion 35 of the braking member 30 is distorted to store a restoring force when the braking section 33 of the braking member 30 presses the wheel 12 and when the locking section 31 of the braking member 30 engages the locking portion 141 of the locking disk 14.

The drive unit 40 includes a driving plate 41 pivotally connected with the braking member 30, and a linking block 42 pivotally connected with the driving plate 41. The driving plate 41 of the drive unit 40 has a side provided with an opening 411 to receive the linking block 42. The driving plate 41 of the drive unit 40 has a first end provided with a first pivot section 412 and a second end provided with a second pivot section 413. The first pivot section 412 of the driving plate 41 is pivotally connected with the linking block 42 of the drive unit 40. The second pivot section 413 of the driving plate 41 is pivotally connected with the mounting portion 32 of the braking member 30. The linking block 42 of the drive unit 40 is pivotally mounted in the opening 411 of the driving plate 41 and abuts a top wall of the mounting bracket 20. The first pivot section 412 and the second pivot section 413 of the driving plate 41 are received in the mounting bracket 20, and the linking block 42 of the drive unit 40 is received in the mounting bracket 20.

Figure 4:
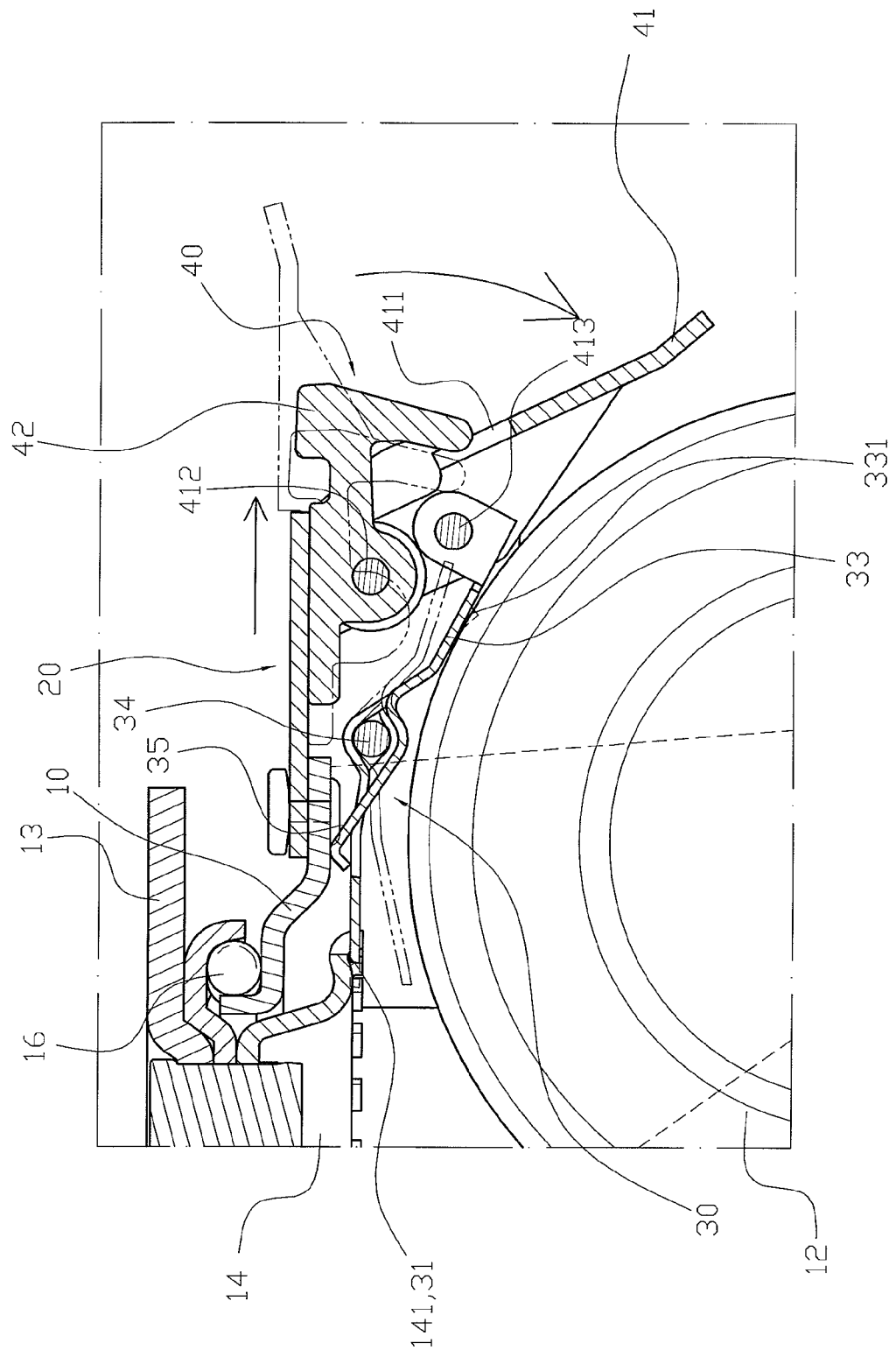
FIG. 4 is a schematic operational view of the castor as shown in FIG. 3.

In operation, referring to FIGS. 3 and 4 with reference to FIGS. 1 and 2, when the driving plate 41 of the drive unit 40 is parallel with the mounting bracket 20, the braking section 33 of the braking member 30 is spaced from the wheel 12 to release the wheel 12, and the locking section 31 of the braking member 30 is spaced from the locking portion 141 of the locking disk 14 to release the base bracket 10 as shown in FIG. 3 so that the wheel 12 can be rotated relative to the base bracket 10, and the base bracket 10 can be rotated relative to the connecting board 13.

When the driving plate 41 of the drive unit 40 is pressed downward, the braking member 30 is driven by the driving plate 41 of the drive unit 40 and is pivoted relative to the locking disk 14 and the wheel 12 so that the braking section 33 of the braking member 30 is moved downward to press the wheel 12 so as to lock the wheel 12, and the locking section 31 of the braking member 30 is moved upward to engage the locking portion 141 of the locking disk 14 so as to lock the base bracket 10 as shown in FIG. 4. At this time, the elastic resting portion 35 of the braking member 30 is pressed upward and distorted to store a restoring force when the braking section 33 of the braking member 30 presses the wheel 12 and when the locking section 31 of the braking member 30 engages the locking portion 141 of the locking disk 14.

In addition, when the driving plate 41 of the drive unit 40 is pressed downward successively to reach an inclined state, the linking block 42 of the drive unit 40 is driven to move toward the driving plate 41 of the drive unit 40, so that the linking block 42 of the drive unit 40 is moved to pass through the opening 411 of the driving plate 41 and to press the driving plate 41 of the drive unit 40 so as to position the driving plate 41 of the drive unit 40 in place. In such a manner, when the linking block 42 of the drive unit 40 is driven to move outward relative to the driving plate 41 of the drive unit 40 and to space from the driving plate 41 of the drive unit 40, the driving plate 41 of the drive unit 40 is released by and unlocked from the linking block 42 of the drive unit 40, so that the braking member 30 can be pivoted to the original position by the restoring force of the elastic resting portion 35. Thus, the braking section 33 of the braking member 30 is moved upward to space from the wheel 12 so as to unlock the wheel 12, and the locking section 31 of the braking member 30 is moved downward to space from the locking portion 141 of the locking disk 14 so as to unlock the base bracket 10 as shown in FIG. 3.

Accordingly, when the drive unit 40 is pressed, the braking member 30 is driven by the drive unit 40 and is pivoted relative to the locking disk 14 and the wheel 12 so that the braking section 33 of the braking member 30 is moved downward to press the wheel 12 so as to brake and lock the wheel 12, and the locking section 31 of the braking member 30 is moved upward to engage the locking portion 141 of the locking disk 14 so as to lock and position the base bracket 10. In addition, the wheel 12 is locked onto the base bracket 10, and the base bracket 10 is locked onto the connecting board 13 so that the castor is braked and positioned exactly and stably.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor, comprising:
a connecting board;
a base bracket pivotally connected with the connecting board;
a locking disk connected with the connecting board;
a wheel rotatably mounted on the base bracket;
a mounting bracket secured on the base bracket;
a braking member pivotally connected with the mounting bracket and releasably locked onto the locking disk and the wheel to releasably lock the base bracket relative to the connecting board and to releasably lock the wheel relative the base bracket; and
a drive unit pivotally connected with the braking member to move the braking member relative to the locking disk and the wheel;
wherein the locking disk has a periphery provided with a toothed locking portion;
the braking member has a first end provided with a toothed locking section that is movable to engage the locking portion of the locking disk and a second end provided with a mounting portion;
the second end portion of the braking member has a side provided with a braking section that is movable to press the wheel;
the drive unit includes a driving plate pivotally connected with the braking member, and a linking block pivotally connected with the driving plate;
the driving plate of the drive unit has a first end provided with a first pivot section and a second end provided with a second pivot section;
the first pivot section of the driving plate is pivotally connected with the linking block of the drive unit;

the second pivot section of the driving plate is pivotally connected with the mounting portion of the braking member.

2. The castor of claim 1, wherein
the braking member has a mediate portion provided with a pivot portion pivotally connected with the mounting bracket;
the pivot portion of the braking member is disposed between the locking section and the braking section of the braking member;
the pivot portion of the braking member has a surface provided with an elastic resting portion abutting a top wall of the base bracket.

3. The castor of claim 2, wherein
the locking section of the braking member is disposed under the locking portion of the locking disk at a normal state;
the braking section of the braking member is disposed above the wheel at a normal state and presses the wheel when the locking section of the braking member engages the locking portion of the locking disk;
the elastic resting portion of the braking member abuts the top wall of the base bracket when the braking section of the braking member is spaced from the wheel and when the locking section of the braking member is spaced from the locking portion of the locking disk.

4. The castor of claim 1, wherein
the driving plate of the drive unit has a side provided with an opening to receive the linking block;
the linking block of the drive unit is pivotally mounted in the opening of the driving plate.

5. The castor of claim 1, wherein the braking section of the braking member has a bottom provided with a plurality of engaging blocks that are movable to engage the wheel.

6. The castor of claim 1, wherein
the base bracket has a substantially inverted U-shaped profile;
the mounting bracket has a substantially inverted U-shaped profile.

7. The castor of claim 1, wherein
the base bracket has an inner portion provided with a receiving space to receive the locking disk and the wheel;
the locking disk is disposed in the receiving space of the base bracket and is located above the wheel;
the mounting bracket is mounted on an open side of the base bracket and is located beside the receiving space of the base bracket.

8. The castor of claim 1, wherein
the braking member is an elastic plate;
the braking member is pivotally mounted in the mounting bracket.

9. The castor of claim 1, wherein
the base bracket is pivotally connected with the connecting board by a bearing;
the base bracket has a top pivotally connected with the connecting board;
the locking disk is fixedly connected with the connecting board by an upright support shaft.

10. The castor of claim 1, wherein
the linking block of the drive unit abuts a top wall of the mounting bracket;
the first pivot section and the second pivot section of the driving plate are received in the mounting bracket;
the linking block of the drive unit is received in the mounting bracket.

\* \* \* \* \*